United States Patent [19]

Bianchini

[11] Patent Number: 5,456,564
[45] Date of Patent: Oct. 10, 1995

[54] WINCH OPERATED VEHICLE MOUNTED CARRIER

[76] Inventor: Thomas R. Bianchini, 250 W. High St., Pottstown, Pa. 19464

[21] Appl. No.: 350,810

[22] Filed: Dec. 7, 1994

[51] Int. Cl.⁶ .................................................... B60P 9/00
[52] U.S. Cl. ...................... 414/462; 414/917; 224/508; 224/521; 224/526; 224/537; 224/924
[58] Field of Search ................................ 414/462, 917; 224/42.03 R, 42.03 B, 42.07, 42.08, 282, 310

[56] References Cited

U.S. PATENT DOCUMENTS

| | | | |
|---|---|---|---|
| 2,967,635 | 11/1957 | Barnett | 414/462 |
| 3,754,672 | 8/1973 | Blomquist et al. | 414/462 |
| 3,931,903 | 1/1976 | Johnson | 414/462 |
| 4,815,638 | 3/1989 | Hutyra | 224/42.03 B |
| 4,932,829 | 6/1990 | Miller | 414/462 |

*Primary Examiner*—Michael S. Huppert
*Assistant Examiner*—Douglas A. Hess

[57] ABSTRACT

A new and improved winch operated vehicle mounted carrier comprised of an upper rectangular section having a securement bar extending inwardly therefrom. The securement bar is received within a class 3 trailer hitch for securement of the upper rectangular section thereto. An electric winch is secured to the upper rectangular section. The electric winch has a drive cable theresecured. The drive cable has a securement portion extending downwardly therefrom. The invention includes two pairs of arms. Each of the two pairs of arms is pivotally secured to a lower portion of the upper rectangular section. A lower support bracket is pivotally secured to an opposing end of the two pairs of arms. A latch is secured to a middle portion of the lower support bracket. The latch couples with the securement portion of the drive cable of the electric winch. A lower support tray is secured across the lower support bracket. Two spring-loaded catches are secured to an outer portion of the upper rectangular section. The catches engage the outwardly extending tabs of the arms in a locked position when the electric winch pulls the lower support bracket to a position adjacent the upper rectangular section.

3 Claims, 4 Drawing Sheets

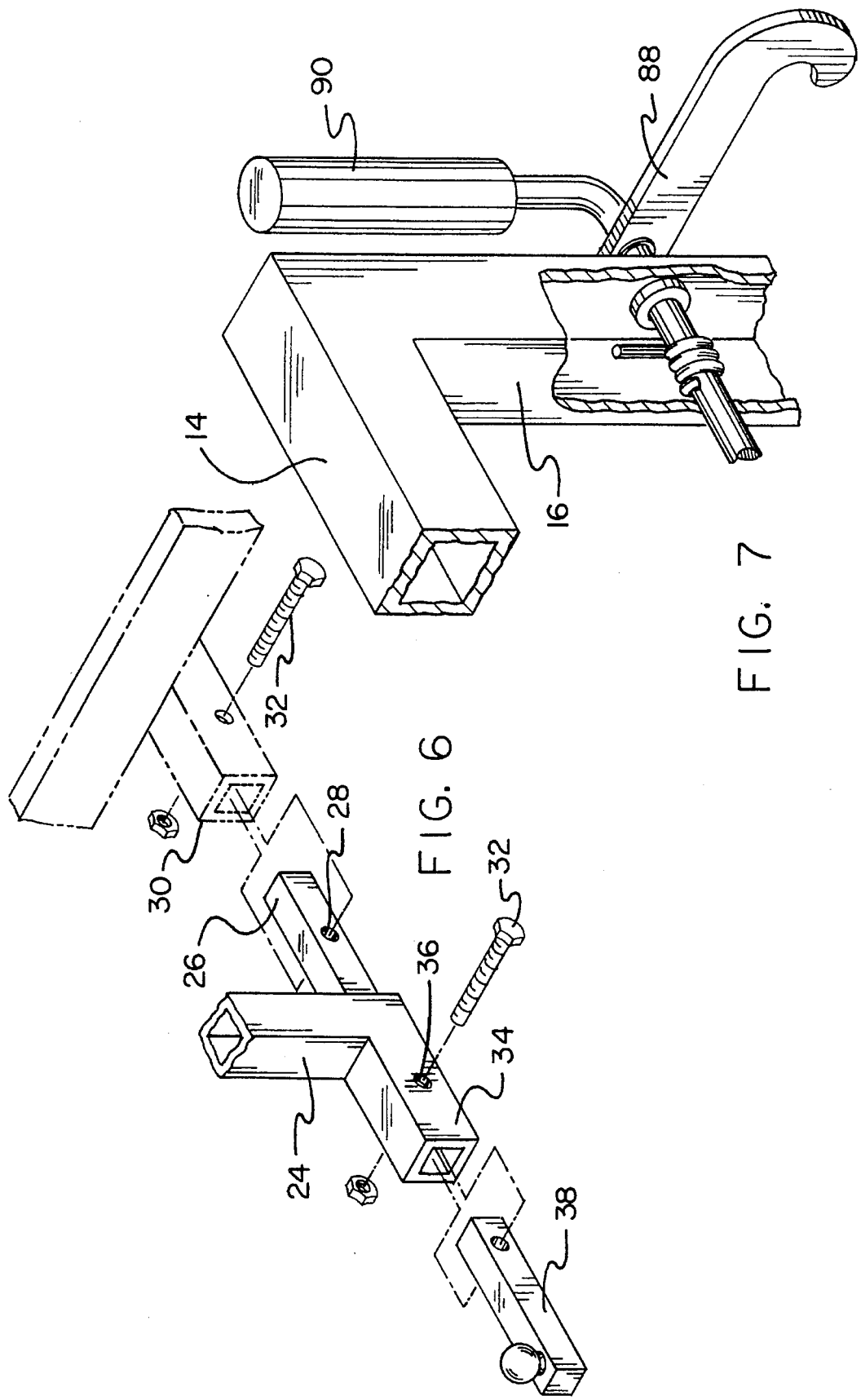

WINCH OPERATED VEHICLE MOUNTED CARRIER

BACKGROUND OF THE INVENTION

1. Field of the Invention

The present invention relates to a winch operated vehicle mounted carrier and more particularly pertains to enabling mopeds, bicycles, and other travelling essentials to be transported with considerable ease with a winch operated vehicle mounted carrier.

2. Description of the Prior Art

The use of carriers for cars is known in the prior art. More specifically, carriers for cars heretofore devised and utilized for the purpose of transporting objects on the rear of a vehicle are known to consist basically of familiar, expected and obvious structural configurations, notwithstanding the myriad of designs encompassed by the crowded prior art which have been developed for the fulfillment of countless objectives and requirements.

By way of example, U.S. Pat. No. 4,815,638 to Hutyra discloses a moped carrier.

U.S. Pat. No. 4,318,501 to Graber discloses a bumper mounted carrier rack.

U.S. Pat. No. 4,189,274 to Shaffer discloses a two-wheeled cycle bumper carrier for motor vehicles.

U.S. Pat. No. 3,591,029 to Coffey discloses a cycle carrier for an automotive vehicle.

U.S. Pat. No. 3,720,333 to Vaughn discloses a motorcycle carrier.

While these devices fulfill their respective, particular objective and requirements, the aforementioned patents do not describe a winch operated vehicle mounted carrier for enabling mopeds, bicycles, and other travelling essentials to be transported with considerable ease.

In this respect, the winch operated vehicle mounted carrier according to the present invention substantially departs from the conventional concepts and designs of the prior art, and in doing so provides an apparatus primarily developed for the purpose of enabling mopeds, bicycles, and other travelling essentials to be transported with considerable ease.

Therefore, it can be appreciated that there exists a continuing need for new and improved winch operated vehicle mounted carrier which can be used for enabling mopeds, bicycles, and other travelling essentials to be transported with considerable ease. In this regard, the present invention substantially fulfills this need.

SUMMARY OF THE INVENTION

In the view of the foregoing disadvantages inherent in the known types of carriers for cars now present in the prior art, the present invention provides an improved winch operated vehicle mounted carrier. As such, the general purpose of the present invention, which will be described subsequently in greater detail, is to provide a new and improved winch operated vehicle mounted carrier and method which has all the advantages of the prior art and none of the disadvantages.

To attain this, the present invention essentially comprises an upper rectangular section having an upper cross bar and two vertical support bars extending downwardly from end portions of the upper cross bar. A lower cross bar is secured between the two vertical support bars near end portions thereof. A middle support has a first end secured to a lower portion of the upper cross bar. The middle support has a second end secured to an upper portion of the lower cross bar. The second end has a securement bar extending inwardly therefrom. The securement bar has an aperture formed therethrough. The securement bar is received within a class 3 trailer hitch for securement of the upper rectangular section thereto by a fastening means through the aperture of the securement bar. The second end of the middle support has a receiving hitch extending outwardly therefrom. The receiving hitch has an aperture formed therethrough. The receiving hitch optionally receives a tow bar therein and is secured by a fastening means through the aperture of the receiving hitch. An electric winch is secured to the upper cross bar of the upper rectangular section. The electric winch has a drive cable theresecured. The drive cable has a securement portion extending downwardly therefrom. The device contains two pairs of upper arms. Each of the two pairs of upper arms has a first end and a second end. Each first end is pivotally secured to a lower portion of the two vertical support bars of the upper rectangular section. Each second end has an outwardly extending tab upwardly thereof. The device contains two pairs of lower arms. Each of the two pairs of lower arms has a first end and a second end. Each first end is pivotally secured to a lower portion of the two vertical support bars downwardly of the two pairs of upper arms. The device contains a lower support bracket having a cross bar. The cross bar has two extension brackets extending outwardly from end portions thereof. An upper support bar is secured to an upper surface of the end portions of the cross bar. Each upper support bar is pivotally secured to each second end of the two pairs of upper arms and the two pairs of lower arms. A latch is secured to a middle portion of the cross bar. The latch couples with the securement portion of the drive cable of the electric winch whereby the electric winch pulls the lower support bracket to a position adjacent the upper rectangular section. The device contains a lower support tray having an open first end and a closed second end. The lower support tray is secured across the two extension brackets of the lower support bracket. The open first end curves downwardly to provide a ramp. The lower support tray serves to hold a moped or bicycle thereon. The device contains two spring-loaded catches. Each of the two spring-loaded catches is secured to an outer portion of the two vertical support bars of the upper rectangular section. The two spring-loaded catches have a handle thereon. The catches engage the outwardly extending tabs of the upper arms in a locked position when the electric winch pulls the lower support bracket to a position adjacent the upper rectangular section.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved winch operated vehicle mounted carrier which has all the advantages of the prior art carriers for cars and none of the disadvantages.

It is another object of the present invention to provide a new and improved winch operated vehicle mounted carrier which may be easily and efficiently manufactured and marketed.

It is a further object of the present invention to provide a new and improved winch operated vehicle mounted carrier which is of durable and reliable construction.

An even further object of the present invention is to provide a new and improved winch operated vehicle mounted carrier which is susceptible of a low cost of manufacture with regard to both materials and labor, and which accordingly is then susceptible of low prices of sale to the consuming public, thereby making such a winch operated vehicle mounted carrier economically available to the buying public.

Still yet another object of the present invention is to provide a new and improved winch operated vehicle mounted carrier which provides in the apparatuses and methods of the prior art some of the advantages thereof, while simultaneously overcoming some of the disadvantages normally associated therewith.

Even still another object of the present invention is to provide a new and improved winch operated vehicle mounted carrier for enabling mopeds, bicycles, and other travelling essentials to be transported with considerable ease.

Lastly, it is an object of the present invention to provide a new and improved winch operated vehicle mounted carrier comprised of an upper rectangular section having a securement bar extending inwardly therefrom. The securement bar has an aperture formed therethrough. The securement bar is received within a class 3 trailer hitch for securement of the upper rectangular section thereto by a fastening means through the aperture of the securement bar. An electric winch is secured to the upper rectangular section. The electric winch has a drive cable theresecured. The drive cable has a securement portion extending downwardly therefrom. The invention includes two pairs of arms. Each of the two pairs of arms has a first end and a second end. Each first end is pivotally secured to a lower portion of the upper rectangular section. Each second end has an outwardly extending tab upwardly thereof. A lower support bracket is pivotally secured to each second end of the two pairs of arms. A latch is secured to a middle portion of the lower support bracket. The latch couples with the securement portion of the drive cable of the electric winch whereby the electric winch pulls the lower support bracket to a position adjacent the upper rectangular section. A lower support tray is secured across the lower support bracket. Two spring-loaded catches are secured to an outer portion of the upper rectangular section. The two spring-loaded catches have a handle thereon. The catches engage the outwardly extending tabs of the arms in a locked position when the electric winch pulls the lower support bracket to a position adjacent the upper rectangular section.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 6 is an exploded view of the hitch attachment of the present invention.

FIG. 7 is a perspective view of the winch handle and lock of the present invention.

The same reference numerals refer to the same parts through the various Figures.

DESCRIPTION OF THE PREFERRED EMBODIMENT

Figure 1:
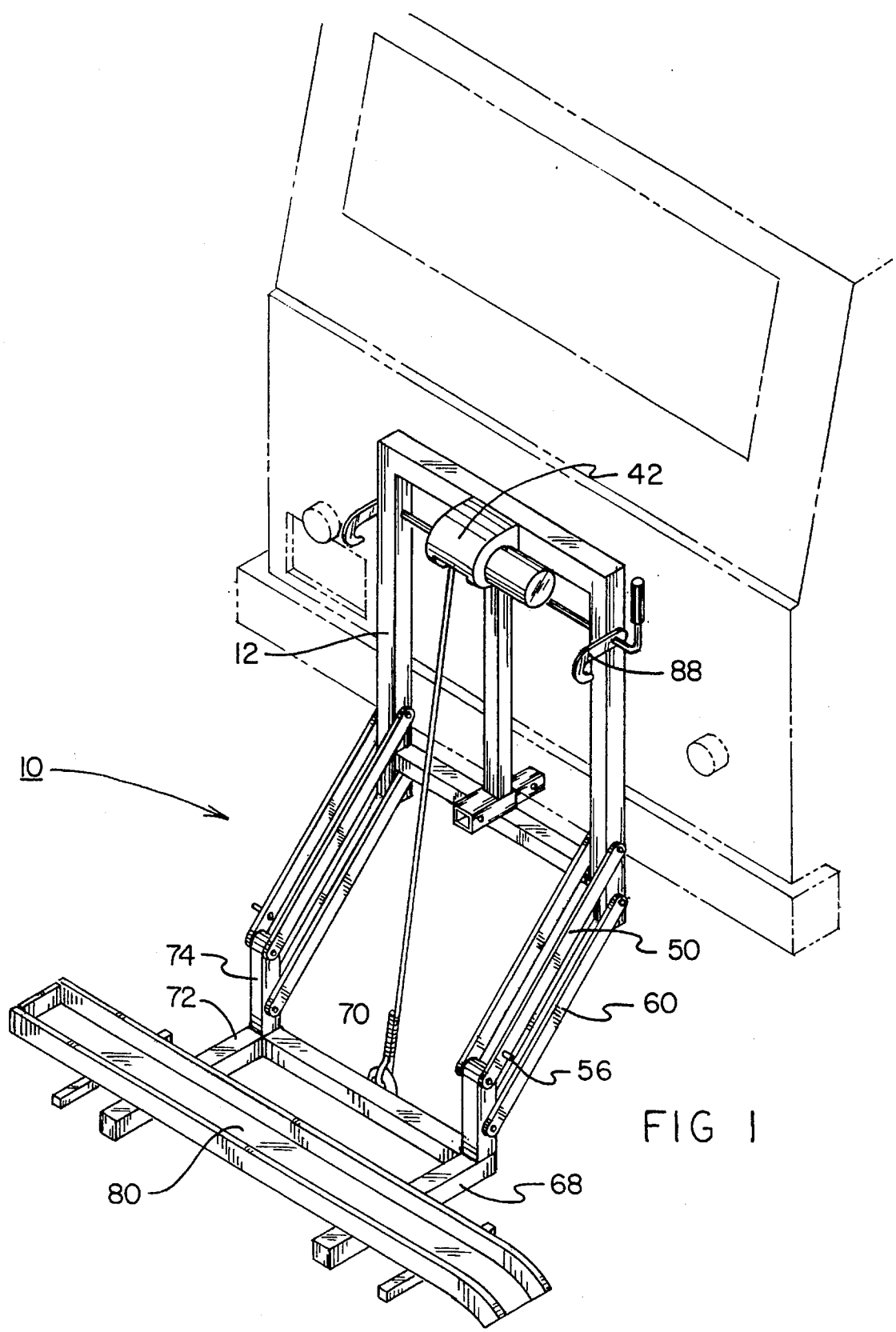
FIG. 1 is a perspective view of the preferred embodiment of the winch operated vehicle mounted carrier constructed in accordance with the principles of the present invention.
Figure 2:
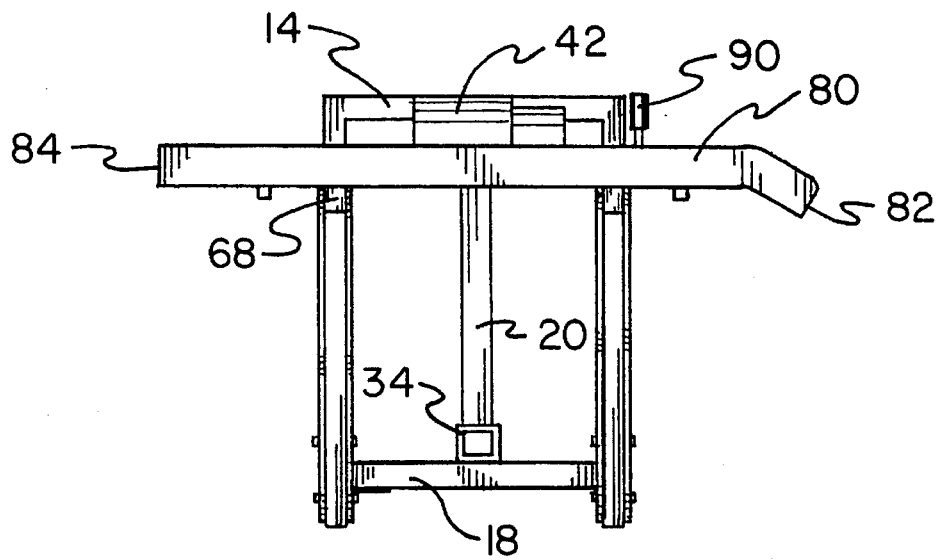
FIG. 2 is a front elevation view of the present invention in the locked position.
Figure 3:
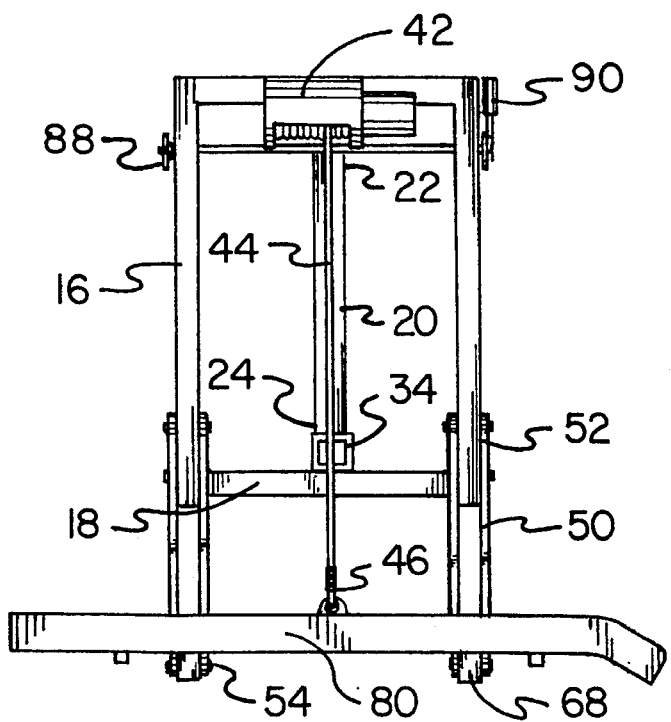
FIG. 3 is a front elevation view of the present invention in the unlocked position.
Figure 4:
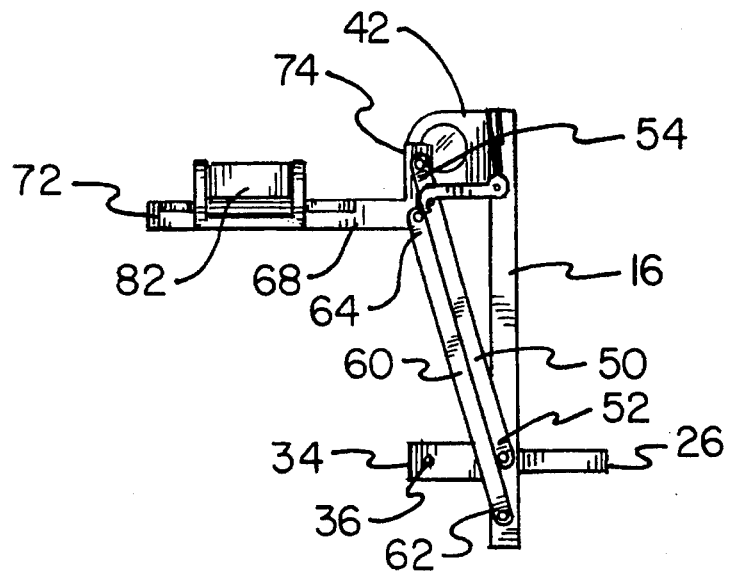
FIG. 4 is a side view of the present invention in the locked position.
Figure 5:
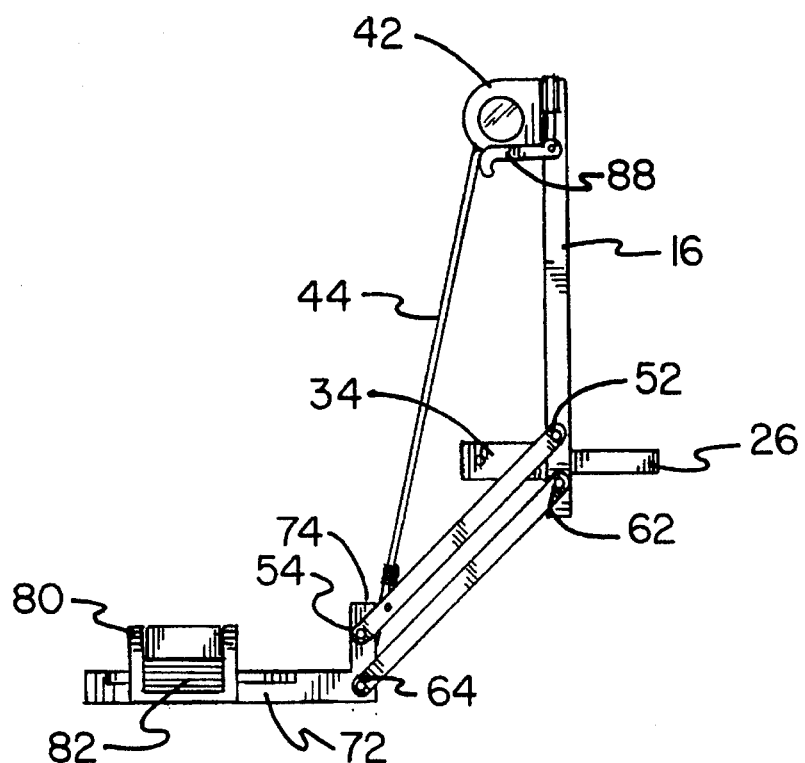
FIG. 5 is a side view of the present invention in the unlocked position.

With reference now to the drawings, and in particular, to FIG. 1 thereof, the preferred embodiment of the new and improved winch operated vehicle mounted carrier embodying the principles and concepts of the present invention and generally designated by the reference number 10 will be described.

Specifically, it will be noted in the various Figures that the device relates to a new and improved winch operated vehicle mounted carrier for enabling mopeds, bicycles, and other travelling essentials to be transported with considerable ease. In its broadest context, the device consists of an upper rectangular section, an electric winch, two pairs of upper arms, two pairs of lower arms, a lower support bracket, a lower support tray, and two spring-loaded catches.

The device 10 contains an upper rectangular section 12 having an upper cross bar 14 and two vertical support bars 16 extending downwardly from end portions of the upper cross bar 14. A lower cross bar 18 is secured between the two vertical support bars 16 near end portions thereof. A middle support 20 has a first end 22 secured to a lower portion of the upper cross bar 14. The middle support 20 has a second end 24 secured to an upper portion of the lower cross bar 18. The second end 24 has a securement bar 26 extending inwardly therefrom. The securement bar 26 has an aperture 28 formed therethrough. The securement bar 26 is received within a class 3 trailer hitch 30 for securement of the upper rectangular section 12 thereto by a fastening means 32 through the aperture 28 of the securement bar 26. The second end 24 of the middle support 20 has a receiving hitch 34 extending outwardly therefrom. The receiving hitch 34 has an aperture 36 formed therethrough. The receiving hitch 34 optionally receives a tow bar 38 therein and is secured by a fastening means 32 through the aperture 36 of the receiving hitch 34.

An electric winch 42 is secured to the upper cross bar 14 of the upper rectangular section 12. The electric winch 42 has a drive cable 44 theresecured. The drive cable 44 has a securement portion 46 extending downwardly therefrom.

The device 10 contains two pairs of upper arms 50. Each of the two pairs of upper arms 50 has a first end 52 and a second end 54. Each first end 52 is pivotally secured to a lower portion of the two vertical support bars 16 of the upper rectangular section 12. Each second end 54 has an outwardly extending tab 56 upwardly thereof.

The device 10 contains two pairs of lower arms 60. Each of the two pairs of lower arms 60 has a first end 62 and a second end 64. Each first end 62 is pivotally secured to a lower portion of the two vertical support bars 16 downwardly of the two pairs of upper arms 50.

The device 10 contains a lower support bracket 68 having a cross bar 70. The cross bar 70 has two extension brackets 72 extending outwardly from end portions thereof. An upper support bar 74 is secured to an upper surface of the end portions of the cross bar 70. Each upper support bar 74 is pivotally secured to each second end 54,64 of the two pairs of upper arms 50 and the two pairs of lower arms 60. A latch 76 is secured to a middle portion of the cross bar 70. The latch 76 couples with the securement portion 46 of the drive cable 44 of the electric winch 42 whereby the electric winch 42 pulls the lower support bracket 68 to a position adjacent the upper rectangular section 12.

The device 10 contains a lower support tray 80 having an open first end 82 and a closed second end 84. The lower support tray 80 is secured across the two extension brackets 72 of the lower support bracket 68. The open first end 82 curves downwardly to provide a ramp. The lower support tray 80 serves to hold a moped or bicycle thereon.

The device 10 contains two spring-loaded catches 88. Each of the two spring-loaded catches 88 is secured to an outer portion of the two vertical support bars 16 of the upper rectangular section 12. The two spring-loaded catches 88 have a handle 90 thereon. The catches 88 engage the outwardly extending tabs 56 of the upper arms 50 in a locked position when the electric winch 42 pulls the lower support bracket 68 to a position adjacent the upper rectangular section 12.

The present invention is a device for the rear hitch of a trailer or motorhome that enables bicycles, mopeds, and other travelling essentials to be carried with relative ease.

It is fabricated from a steel tubing frame and a electric winch. Smaller sections of sheet steel are stamped to create flanges and two locks. The frame is divided into two sections, a vertical immoveable section that is closest to the rear of the vehicle, and a hinged forward section that is connected to the winch. The hinge is located on the lower front edge of the frame while the winch is positioned on the top of the rear section. Attached from the winch to the top edge of the frame is a drive cable. The two ears of the front section of the frame have welded tabs that serve as a locking feature. They engage matching safety locks on the rear of the frame. The locks incorporate a spring-loaded catch that reliably secures the tabs.

To use the system for raising and transporting a moped, for example, it is first installed onto the vehicles class 3 hitch. The hitch may still be used to tow a boat trailer, however. Then, it is lowered to the ground using the winch and the moped is placed on it. The movable section of the frame is raised and the tabs lock the moped in place.

There is virtually no lifting required, and the unit can be used to accommodate a wide variety of bulky items. People who normally transport their bikes inside a motorhome should find this invention a very attractive alternative.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and the manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modification and changes will readily occur to those skilled in the art, it is not desired to limit the invention to the exact construction and operation shown and described, and accordingly, all suitable modification and equivalents may be resorted to, falling within the scope of the invention.

What is claimed as being new and desired to be protected by Letters Patent of the United States is as follows:

1. A new and improved winch operated vehicle mounted carrier for enabling mopeds, bicycles, and other travelling essentials to be transported with considerable ease comprising, in combination:

an upper rectangular section having an upper cross bar and two vertical support bars extending downwardly from end portions of the upper cross bar, a lower cross bar secured between the two vertical support bars near end portions thereof, a middle support having a first end and a second end, the first end secured to a lower portion of the upper cross bar, the second end secured to an upper portion of the lower cross bar, the second end having a securement bar extending inwardly therefrom, the securement bar having an aperture formed therethrough, the securement bar received within a class 3 trailer hitch for securement of the upper rectangular section thereto by a fastening means through the aperture thereof, the second end of the middle support having a receiving hitch extending outwardly therefrom, the receiving hitch having an aperture formed therethrough, the receiving hitch optionally receiving a tow bar therein and secured by a fastening means through the aperture thereof;

an electric winch secured to the upper cross bar of the upper rectangular section, the electric winch having a drive cable theresecured, the drive cable having a securement portion extending downwardly therefrom;

two pairs of upper arms, each of the two pairs of upper arms having a first end and a second end, each first end pivotally secured to a lower portion of the two vertical support bars of the upper rectangular section, each second end having an outwardly extending tab upwardly thereof;

two pairs of lower arms, each of the two pairs of lower arms having a first end and a second end, each first end pivotally secured to a lower portion of the two vertical support bars downwardly of the two pairs of upper arms;

a lower support bracket having a cross bar, the cross bar having two extension brackets extending outwardly from end portions thereof, upper support bars secured to an upper surface of each end portion of the cross bar, each upper support bar pivotally secured to each second end of the two pairs of upper arms and the two pairs of lower arms, a latch secured to a middle portion of the cross bar, the latch coupling with the securement portion of the drive cable of the electric winch whereby the electric winch pulls the lower support bracket to a position adjacent the upper rectangular section;

a lower support tray having an open first end and a closed second end, the lower support tray secured across the two extension brackets of the lower support bracket, the open first end curving downwardly to provide a ramp, the lower support tray serving to hold a moped or bicycle thereon;

two spring-loaded catches, each of the two spring-loaded catches secured to an outer portion of the two vertical support bars of the upper rectangular section, the two spring-loaded catches having a handle thereon, the catches engaging the outwardly extending tabs of the upper arms in a locked position when the electric winch pulls the lower support bracket to a position adjacent the upper rectangular section.

2. A new and improved winch operated vehicle mounted carrier for enabling mopeds, bicycles, and other travelling essentials to be transported with considerable ease comprising, in combination:

an upper rectangular section having a securement bar extending inwardly therefrom, the securement bar having an aperture formed therethrough, the securement bar received within a class 3 trailer hitch for securement of the upper rectangular section thereto by a fastening means through the aperture thereof;

an electric winch secured to the upper rectangular section, the electric winch having a drive cable theresecured, the drive cable having a securement portion extending downwardly therefrom;

two pairs of arms, each of the two pairs of arms having a first end and a second end, each first end pivotally secured to a lower portion of the upper rectangular section, each second end having an outwardly extending tab upwardly thereof;

a lower support bracket pivotally secured to each second end of the two pairs of arms, a latch secured to a middle portion of the lower support bracket, the latch coupling with the securement portion of the drive cable of the electric winch whereby the electric winch pulls the lower support bracket to a position adjacent the upper rectangular section;

a lower support tray secured across the lower support bracket;

two spring-loaded catches, each of the two spring-loaded catches secured to an outer portion of the upper rectangular section, the two spring-loaded catches having a handle thereon, the catches engaging the outwardly extending tabs of the arms in a locked position when the electric winch pulls the lower support bracket to a position adjacent the upper rectangular section.

3. The carrier as described in claim 2 and further including wherein the lower support tray having an open first end and a closed second end, the open first end curving downwardly to provide a ramp, the lower support tray serving to hold a moped or bicycle thereon.

* * * * *